US011905899B2

(12) United States Patent
Kalluri et al.

(10) Patent No.: US 11,905,899 B2
(45) Date of Patent: Feb. 20, 2024

(54) SMART FIRING PATTERN SELECTION FOR SKIP FIRE CAPABLE ENGINES

(71) Applicants: Srihari Kalluri, Ann Arbor, MI (US); Mark A Shost, Northville, MI (US)

(72) Inventors: Srihari Kalluri, Ann Arbor, MI (US); Mark A Shost, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/412,606

(22) Filed: Aug. 26, 2021

(65) Prior Publication Data

US 2023/0069140 A1 Mar. 2, 2023

(51) Int. Cl.

| | |
|---|---|
| ***F02D 41/00*** | (2006.01) |
| ***F02D 41/14*** | (2006.01) |
| ***F02D 41/02*** | (2006.01) |
| ***F02D 41/24*** | (2006.01) |
| *F02D 13/06* | (2006.01) |

(52) U.S. Cl.

CPC ..... *F02D 41/0087* (2013.01); *F02D 41/0215* (2013.01); *F02D 41/1401* (2013.01); *F02D 41/2422* (2013.01); *F02D 13/06* (2013.01); *F02D 2041/1433* (2013.01); *F02D 2200/0406* (2013.01)

(58) Field of Classification Search

CPC .. F02D 13/06; F02D 41/0087; F02D 41/0215; F02D 41/1401; F02D 41/2422; F02D 2041/1433; F02D 2200/0406

See application file for complete search history.

(56) References Cited

U.S. PATENT DOCUMENTS

| | | | | |
|---|---|---|---|---|
| 9,441,550 | B2 | 9/2016 | Li et al. | |
| 10,100,754 | B2 | 10/2018 | Srinivasan | |
| 10,247,121 | B2 | 4/2019 | Shost et al. | |
| 10,619,584 | B2 * | 4/2020 | Fuschetto | F02D 41/0085 |
| 11,180,152 | B1 * | 11/2021 | Bai | F02D 41/0215 |
| 11,261,807 | B2 * | 3/2022 | Fuschetto | F02D 41/0087 |
| 2017/0370342 | A1 | 12/2017 | Nagashima et al. | |
| 2018/0043893 | A1 | 2/2018 | Serrano et al. | |
| 2022/0120230 | A1 * | 4/2022 | Wilcutts | F02D 41/1454 |

* cited by examiner

*Primary Examiner* — Gonzalo Laguarda

(74) *Attorney, Agent, or Firm* — Jeremy J. Klobucar

(57) ABSTRACT

A skip fire control system for an engine of a vehicle includes a set of sensors configured to measure a set of operating parameters of the engine corresponding to a volumetric efficiency of the engine, a set of sub-systems having a set of operational states that affect transitions between different firing patterns/fractions of the engine, and a controller configured to, based on the set of operating parameters and the set of operational states of the set of sub-systems, determine a best firing pattern/fraction by taking into account losses or penalties to transition at least some of the set of operational states of the set of sub-systems to obtain a target firing pattern/fraction, and control the engine based on the target firing pattern/fraction to maximize an efficiency of the engine.

10 Claims, 2 Drawing Sheets

SMART FIRING PATTERN SELECTION FOR SKIP FIRE CAPABLE ENGINES

FIELD

The present application generally relates to skip fire capable engines and, more particularly, to techniques for smart firing pattern selection for skip fire capable engines.

BACKGROUND

Engine skip firing typically involves the selection of a firing pattern (cylinder order) or fraction (half of the cylinders, % of the cylinder, etc.). Conventional skip fire control typically involves the selection of a firing pattern/fraction based on intake manifold absolute pressure (MAP) to minimize pumping losses, which in theory corresponds to maximum engine efficiency. This, however, assumes steady-state conditions. In reality, the transition from a current firing pattern/fraction to a target firing pattern/fraction involves other transient dynamics (e.g., needing to reach a target torque converter clutch (TCC) slip). Thus, due to these other transient dynamics, the target firing pattern/fraction may not actually be the best firing pattern/fraction for maximum engine efficiency. Accordingly, while such conventional skip fire control systems do work for their intended purpose, there exists an opportunity for improvement in the relevant art.

SUMMARY

According to one example aspect of the invention, a skip fire control system for an engine of a vehicle is presented. In one exemplary implementation, the system comprises a set of sensors configured to measure a set of operating parameters of the engine corresponding to a volumetric efficiency of the engine, a set of sub-systems having a set of operational states that affect transitions between different firing patterns/fractions of the engine, and a controller configured to, based on the set of operating parameters and the set of operational states of the set of sub-systems, determine a best firing pattern/fraction by taking into account losses or penalties to transition at least some of the set of operational states of the set of sub-systems to obtain a target firing pattern/fraction, and control the engine based on the target firing pattern/fraction to maximize an efficiency of the engine.

In some implementations, the target firing pattern/fraction is not a firing pattern/fraction corresponding to minimized engine pumping losses by measuring intake manifold absolute pressure (MAP). In some implementations, the best firing fraction/pattern is not an intermediary firing fraction/pattern during a transition to a firing fraction/pattern corresponding to minimized engine pumping losses by measuring intake manifold absolute pressure (MAP). In some implementations, the set of sub-systems comprises a torque converter clutch (TCC). In some implementations, the set of sub-systems further comprises at least one of: a transmission, an active noise cancellation (ANC) system, a camshaft, a throttle valve, and a valvetrain.

In some implementations, the controller is configured to determine the best firing pattern/fraction based further on at least one of road conditions and ambient conditions. In some implementations, the controller is configured to utilize a calibratable look-up table to determine the best firing pattern/fraction. In some implementations, the controller is configured to utilize a physics-based model to determine the best firing pattern/fraction.

According to another example aspect of the present invention, a skip fire control method for an engine of a vehicle is presented. In one exemplary implementation, the method comprises receiving, by a controller of the vehicle and from a set of sensors, a set of operating parameters of the engine corresponding to a volumetric efficiency of the engine, controlling, by the controller, a set of sub-systems having a set of operational states that affect transitions between different firing patterns/fractions of the engine, determining, by the controller, a best firing pattern/fraction based on the set of operating parameters and the set of operational states of the set of sub-systems by taking into account losses or penalties to transition at least some of the set of operational states of the set of sub-systems to obtain a target firing pattern/fraction, and controlling, by the controller, the engine based on the target firing pattern/fraction to maximize an efficiency of the engine.

In some implementations, the target firing pattern/fraction is not a firing pattern/fraction corresponding to minimized engine pumping losses by measuring intake manifold absolute pressure (MAP). In some implementations, the best firing fraction/pattern is not an intermediary firing fraction/pattern during a transition to a firing fraction/pattern corresponding to minimized engine pumping losses by measuring intake manifold absolute pressure (MAP). In some implementations, the set of sub-systems comprises a torque converter clutch (TCC). In some implementations, the set of sub-systems further comprises at least one of a transmission, an active noise cancellation (ANC) system, a camshaft, a throttle valve, and a valvetrain.

In some implementations, the method further comprises determining, by the controller, the best firing pattern/fraction based further on at least one of road conditions and ambient conditions. In some implementations, determining the best firing pattern/fraction comprises utilizing, by the controller, a calibratable look-up table. In some implementations, determining the best firing pattern/fraction comprises utilizing, by the controller, a physics-based model.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional skip fire control systems and methods do not take into account other transient dynamics (e.g., needing to reach a target torque converter clutch (TCC) slip) when selecting a target firing pattern/fraction. The term "firing pattern/fraction" (also referred to as "firing density") as used herein refers to any combination of a particular cylinder firing pattern, a particular cylinder firing fraction (½, ¾, etc.), or a combination of both. By not taking into account these other transient dynamics, the selected firing pattern/fraction may not actually be the best firing pattern/fraction for maximum engine efficiency. In other words, the engine may remain in an inefficient operating region for an extended period of time before actually transitioning to a more optimal operating region corresponding to the selected firing pattern/fraction. Accordingly, improved skip fire control systems and methods that take into account these other transient dynamics (and not just a steady-state selection based on minimized engine pumping losses or maximized engine volumetric efficiency) are presented herein.

Figure 1:
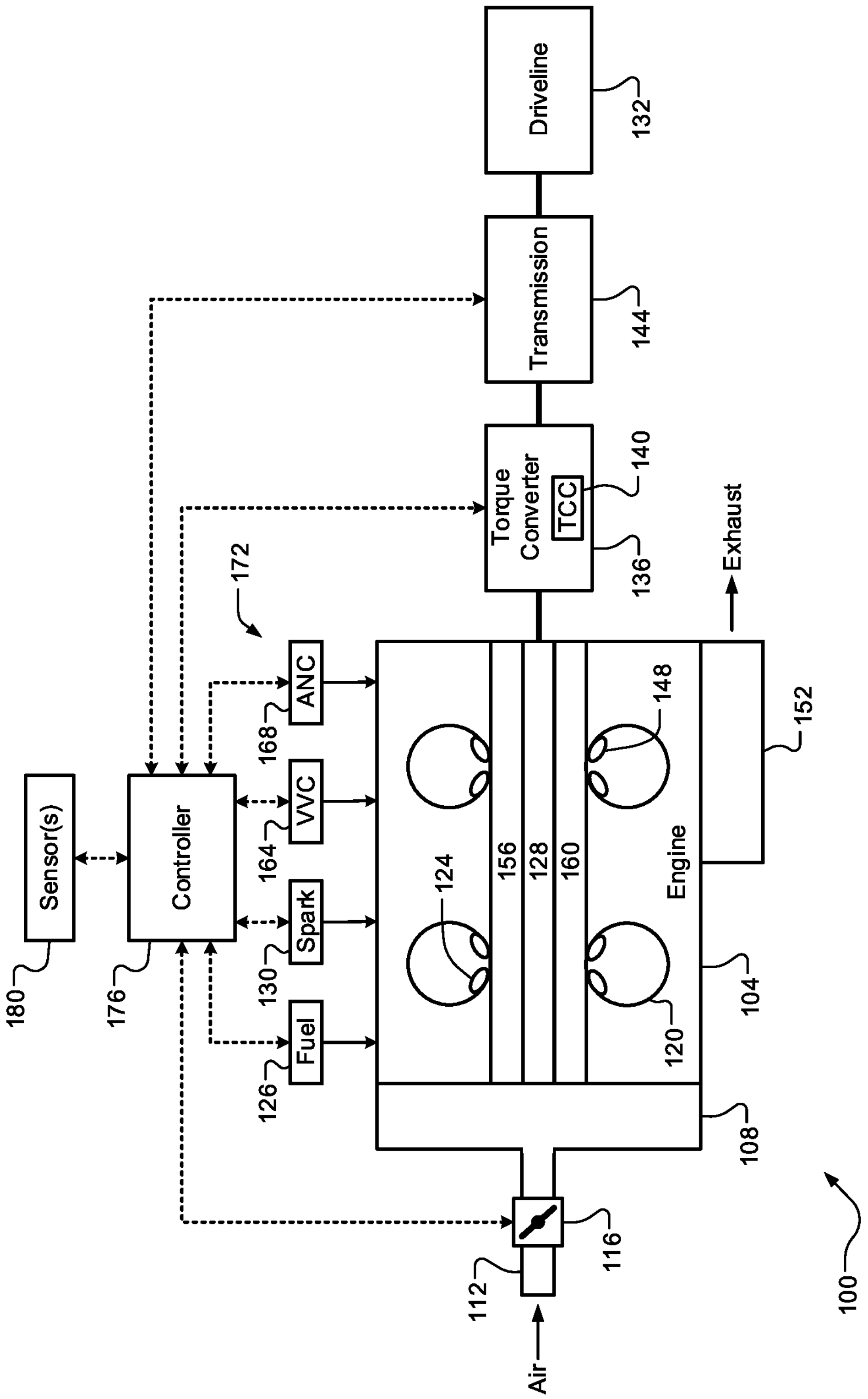
FIG. 1 is a diagram of an example vehicle having and engine with a skip fire control system according to the principles of the present application.

Referring now to FIG. 1, a diagram of an example vehicle 100 having an engine 104 with a skip fire control system according to the principles of the present application is illustrated. The engine 104 draws air into an intake manifold 108 through an induction system 112 that is regulated by a throttle valve 116. The air in the intake manifold 108 is distributed to a plurality of cylinders 120 via respective intake valves 124 and combined with fuel (e.g., gasoline) from a fuel system 126 to create an air/fuel mixture within the cylinders 120. The air/fuel mixture is compressed within the cylinders 120 by respective pistons (not shown) and combusted (e.g., by spark from an ignition system 130) to drive the pistons and generate drive torque at a crankshaft 128, which is then transferred to a driveline 132 via a torque converter 136 (e.g., a fluid coupling with a torque converter clutch (TCC) 140) and a transmission 144.

Exhaust gas resulting from combustion is expelled from the cylinders 120 via respective exhaust valves 148 into an exhaust treatment system 152 before release into the atmosphere. Intake and exhaust camshafts 156, 160 open/close the intake and exhaust valves 124, 148, respectively. A variable valve control (VVC) system 164 is configured to control lift (e.g., low or high/full, or deactivated) of the intake and exhaust valves 124, 148. An active noise cancellation (ANC) system 168 is configured to cancel or suppress noise (e.g., vibration or drone) generated by the engine 104 (e.g., when not all of the cylinders 120 are firing). All of these various systems are generally referred to herein as "a set of sub-systems 172" because they have a set of operational states that affect transitions between different firing patterns/fractions of the engine 104. In other words, each of them may need to be in a particular operational state in order to transition to a particular firing pattern/fraction. The time that it takes for the set of sub-systems to transition to these particular operational states corresponds to a loss or penalty that affects the decision on which firing pattern/fraction to select for optimal engine efficiency.

A controller 176 controls operation of the engine 104 and the set of sub-systems 172. The controller 176 primarily controls the engine 104 and the set of sub-systems 172 to generate an amount of drive torque to meet a driver torque request. The controller 176 determines this driver torque request based on measurements from a set of sensors 180 (e.g., current gear of the transmission 144, current speed of the crankshaft 128 (engine speed), current volumetric efficiency or brake specific fuel consumption of the engine 104, accelerator pedal position or load request, etc.).

As previously discussed, conventional skip fire control systems and methods only take into account minimizing engine pumping losses or maximizing volumetric efficiency, even though the time spent in a current inefficient operating region before the transition to the target firing pattern/fraction ends up being worse for engine efficiency than if the engine 104 were to more quickly transition to another less-optimal firing pattern/fraction.

As previously mentioned, for example, the TCC 140 may have to achieve a target TCC slip before a transition to a particular firing pattern/fraction can occur. In another example, the throttle valve 116 may have to achieve a target position (e.g., % opening) before a transition to a particular firing pattern/fraction can occur. In another example, the intake/exhaust valves 124, 148 may have to achieve a particular state (e.g., closed for cylinder deactivation) before a transition to a particular firing pattern/fraction can occur. In another example, the transmission 144 may have to achieve a target gear before a transition to a particular firing pattern/fraction can occur. In another example, the intake/exhaust camshafts 156, 160 may have to achieve a particular lift profile (e.g., low or high lift) via the VVC system 164 before a transition to a particular firing pattern/fraction can occur.

In yet another example, the ANC system 168 may need to achieve a particular operational state (e.g., sufficient noise suppression) before a transition to a particular firing pattern/fraction can occur. It will be appreciated that these are merely examples of transitional losses/penalties that are accounted for in selecting the optimal firing pattern/fraction.

Figure 2:
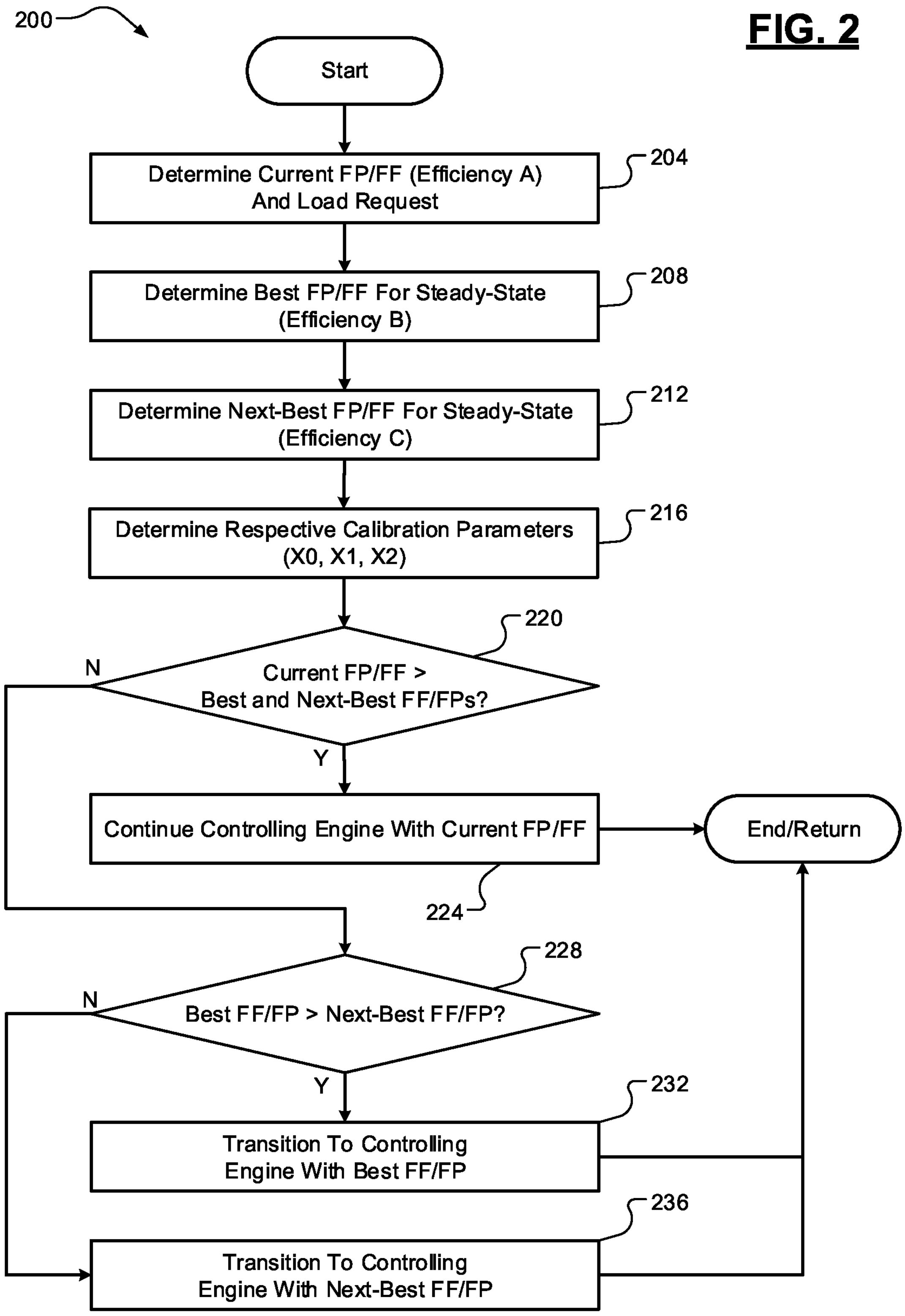
FIG. 2 is a flow diagram of an example skip fire control method for an engine of a vehicle according to the principles of the present application.

Referring now to FIG. 2, a flow diagram of an example skip fire control method 200 for an engine of a vehicle (e.g., engine 104 of vehicle 100) according to the principles of the present application is illustrated. At 204, the controller 176 determines the current firing pattern/fraction, the volumetric efficiency of the engine (efficiency A), and a driver torque (load) request based on measurements from the set of sensors 180. At 208, the controller 176 determines a best firing pattern/fraction (FF/FP) for steady-state based on the measurements from the sensors 180 (transmission gear, engine speed, torque and brake specific fuel consumption or volumetric efficiency, etc.) (efficiency B).

At 212, the controller 176 determines a next-best firing pattern/fraction for steady-state based on the same parameters (efficiency C). At 216, the controller 176 determines a set of calibration parameters (e.g., X0, X1, X2, which could be positive or negative volumetric efficiency values) corresponding to the set of sub-systems 172 to take into account in the selection of a target firing pattern/fraction. This determination can be made using a calibratable look-up table or a physics-based model (e.g., an artificial neural network, or ANN model). These calibration parameters can be predetermined or adaptive (e.g., base values with correction factors based on operating state). Each calibration parameters could be a positive value (e.g., a benefit to volumetric efficiency) or a negative value (e.g., a loss or penalty to volumetric efficiency).

In addition to the operational states of the set of sub-systems 172, other factors could also be taken into account as gains or penalties, such as road conditions (geography, roughness, grade, etc.) and ambient conditions (e.g., weather/temperature). At 220, the controller 176 determines whether the current firing pattern/fraction taking into account its respective calibration parameters is better than both the best firing pattern/fraction taking into account its respective calibration parameters and the next-best firing pattern/fraction taking into account its respective calibration parameters (e.g., is $(A+X0 \geq B+X1)$ and $(A+X0 \geq C+X2)$). When true, the method 200 proceeds to 224 where the controller 176 continues to control the engine 104 according to the current firing pattern/fraction and the method 200 ends or returns to 204. When false, the method 200 proceeds to 228 where the controller determines which of the best and next-best firing patterns/fractions is better when taking into account their respective calibration parameters (e.g., is (B+X1≥C+X2)).

Based on this determination, the method 200 proceeds to either 232 or 236. At 232, the best firing pattern/fraction is determined to be optimal and is selected and used by the controller 176 to control the engine 104 and the method 200 ends or returns to 204. At 236, the next-best firing pattern/fraction is determined to be optimal and is selected and used by the controller 176 to control the engine 104 and the method 200 ends or returns to 204.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A skip fire control system for an engine of a vehicle, the system comprising:

a set of sensors configured to measure a set of operating parameters of the engine corresponding to a volumetric efficiency of the engine;

a plurality of sub-systems having a respective plurality of operational states that each affect transitions between a plurality of different firing patterns/fractions of the engine, wherein the plurality of sub-systems comprises a torque converter clutch (TCC) of the engine, a transmission of the engine, and at least one of a camshaft and a valvetrain of the engine; and a controller configured to:

determine, from the plurality of different firing patterns/fractions of the engine, a first firing pattern/fraction that will cause a lowest relative engine pumping loss, corresponding to a lowest measured manifold absolute pressure (MAP), relative to a remainder of the plurality of different firing patterns/fractions;

determine, for at least the first firing pattern/fraction and a second firing pattern/fraction of the remainder of the plurality of different firing patterns/fractions, a calibration parameter value based on the set of operating parameters and the set of operational states of the plurality of sub-systems, wherein each calibration parameter value is indicative a positive or negative impact to a volumetric efficiency of the engine resulting from switching to an associated firing pattern/fraction;

select the second firing pattern/fraction when its associated calibration parameter value is greater than the calibration parameter value associated with the first firing pattern/fraction to obtain a target firing pattern/fraction, wherein the second firing fraction/pattern is not an intermediary firing fraction/pattern during a transition to the first firing fraction/pattern; and control the engine based on the target firing pattern/fraction to maximize an efficiency of the engine.

2. The system of claim 1, wherein the plurality of sub-systems further comprises an active noise cancellation (ANC) system of the engine.

3. The system of claim 1, wherein the controller is configured to determine the second firing pattern/fraction based further on at least one of road conditions and ambient conditions.

4. The system of claim 1, wherein the controller is configured to utilize a look-up table to determine the second firing pattern/fraction.

5. The system of claim 1, wherein the controller is configured to utilize a physics-based model to determine the second firing pattern/fraction.

6. A skip fire control method for an engine of a vehicle, the method comprising:

receiving, by a controller of the vehicle and from a set of sensors, a set of operating parameters of the engine corresponding to a volumetric efficiency of the engine;

controlling, by the controller, a plurality of sub-systems having a respective plurality of operational states that each affect transitions between a plurality of different firing patterns/fractions of the engine, wherein the plurality of sub-systems comprises a torque converter clutch (TCC) of the engine, a transmission of the engine, and at least one of a camshaft and a valvetrain of the engine;

determining, by the controller and from the plurality of different firing patterns/fractions of the engine, a first firing pattern/fraction that will cause a lowest relative engine pumping loss, corresponding to a lowest measured manifold absolute pressure (MAP), relative to a remainder of the plurality of different firing patterns/fractions;

determining, by the controller and for at least the first firing pattern/fraction and a second firing pattern/fraction of the remainder of the plurality of different firing patterns/fractions, a calibration parameter value based on the set of operating parameters and the plurality of operational states of the plurality of sub-systems, wherein each calibration parameter value is indicative a positive or negative impact to a volumetric efficiency of the engine resulting from switching to an associated firing pattern/fraction;

selecting, by the controller, the second firing pattern/fraction when its associated calibration parameter value is greater than the calibration parameter value associated with the first firing pattern/fraction to obtain a target firing pattern/fraction, wherein the second firing fraction/pattern is not an intermediary firing fraction/pattern during a transition to the first firing fraction/pattern; and controlling, by the controller, the engine based on the target firing pattern/fraction to maximize an efficiency of the engine.

7. The method of claim 6, wherein the plurality of sub-systems further comprises an active noise cancellation (ANC) system of the engine.

8. The method of claim 6, further comprising determining, by the controller, the second firing pattern/fraction based further on at least one of road conditions and ambient conditions.

9. The method of claim 6, wherein determining the second firing pattern/fraction comprises utilizing, by the controller, a look-up table.

10. The method of claim 6, wherein determining the second firing pattern/fraction comprises utilizing, by the controller, a physics-based model.

* * * * *